Nov. 20, 1934.    M. NEWMARK ET AL    1,981,243
LUBRICATING DEVICE
Filed Nov. 11, 1932
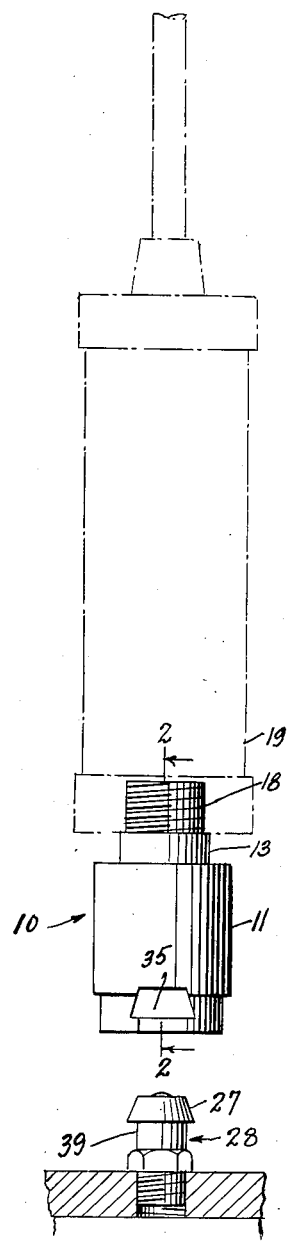
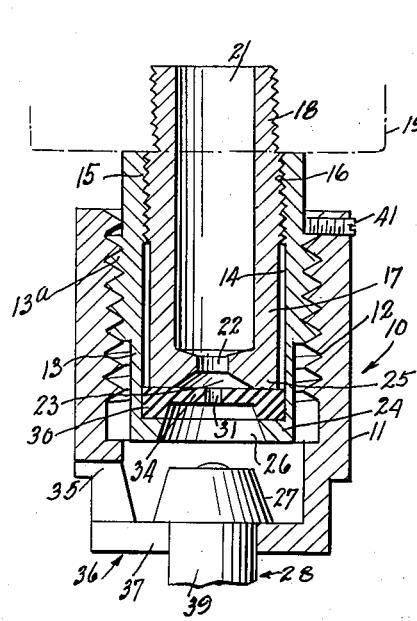
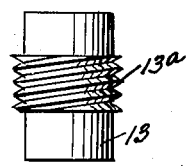
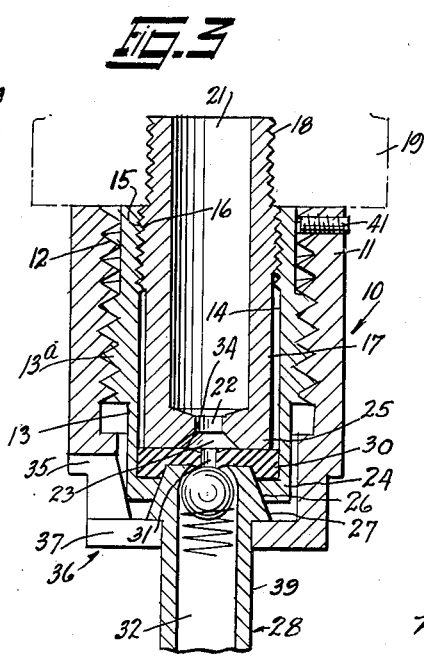
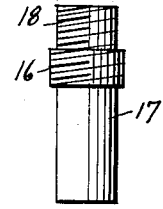
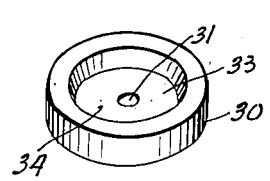
INVENTORS
Morris Newmark
Elias Moss
BY Maurice Block
ATTORNEY Patented Nov. 20, 1934

1,981,243

UNITED STATES PATENT OFFICE 1,981,243

LUBRICATING DEVICE

Morris Newmark and Elias Moss., New York, N. Y.

Application November 11, 1932, Serial No. 642,175

3 Claims. (Cl. 285—143)

This invention relates to lubricating devices of the class adapted to supply grease under pressure to surfaces requiring lubrication.

One of the objects of the invention is to produce a device of this character which may readily be attached to and detached from a nipple or lubricant receiving receptacle, and make leakproof contact therewith.

Another object of the invention is to provide a device of this nature which may be directly secured to a grease gun without any intermediate pipe line or hose so that by a rotary movement of the said gun, the lubricator will be brought into leak-proof contact with the lubricant receiving receptacle after it has been coupled thereto.

A further object of the invention is to provide simple yet effective pressure controlled means for making a leak-proof contact between the lubricant receiving receptacle and lubricating device.

A still further object of the invention is to provide means at the delivery end of the device, which due to the pressure of the lubricant will form a grease-tight seal between the said end and the lubricant receiving receptacle.

Another object is to produce a device of the character described in which the maximum simplicity of construction and operation is secured.

Other objects and advantages will appear as the nature of the improvements is better understood, the invention consisting substantially in the novel arrangement and corelation of parts herein fully described, and illustrated in the accompanying drawing, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

The inventive idea involved is capable of receiving a variety of mechanical expressions, one of which, for the purpose of illustration, is shown in the accompanying drawing, in which Figure 1 is a view in elevation of a preferred form of our improved lubricating device in position ready for coupling with the lubricant receiving receptacle leading to the surface to be lubricated.

Figure 2 is a vertical section taken on line 2—2 Figure 1 showing the device in partial engagement with the receptacle.

Figure 3 is a view similar to Figure 2 but showing the device fully screwed down over the receptacle.

Figure 4 is a bottom plan view of the device.

Figure 5 is a view in elevation of the plunger casing.

Figure 6 is a similar view of the plunger and

Figure 7 is a perspective view of the sealing washer.

Referring now to the drawing in detail 10 indicates a nozzle, comprising an outer shell or barrel 11 having an internally threaded bore 12 in which there is screw threadedly mounted a casing 13 having an internal bore or chamber 14 provided at the top thereof with a screw threaded portion 15. Screw threadedly connected to the casing 13 by means of outer threads 16 in engagement with the threads 15 is a plunger 17 which is provided at the extreme top thereof with a reduced threaded extension 18 which screws into the lower end of a grease gun or pressure lubricator 19.

The plunger 17 is provided with a central longitudinal bore 21 which is in communication at one end with the interior of the pressure lubricator 19, and terminates at its opposite or lower end in a reduced opening 22 which opens into a countersunk portion 23 in the bottom wall 25 of the said plunger. The shell or casing 13 is provided at the bottom with a wall 24 which is in the present instance provided with an upwardly tapering opening 26 to fit the tapering head 27 of a lubricant receiving receptacle or nipple 28. We desire it understood that we do not limit ourselves to the use of a receptacle having a tapered head as a spherical, cylindrical or any other suitably headed receptacle may be employed if so desired.

Within the inner bore 14 there is provided a gasket or washer 30 which is firmly held between the walls 24 and 25 against vertical movement. The said washer is provided with a central opening 31 which is considerably smaller in diameter than either the countersink 23 or the bore 32 of the receptacle 28. The said washer is further provided with a countersink or enlarged opening or undercut 33 to fit the head 27 of the said receptacle 28 and to provide a weakened or substantially thin wall 34.

The nozzle 10 may be brought into engagement with the nipple 28 either from the side or top, for which purpose the barrel or sleeve 11 is provided with a side opening 35 of substantially the same shape as the upper part of the nipple, and a bottom opening 36, the larger portion 37 of which is of substantially the same diameter as the lower portion of the head 27, and the small portion 38 thereof being of the same diameter as the body portion 39 of the nipple; the opening 36 being a continuation of the opening 35.

To attach the device to the nipple, the barrel is either slid from one side of the nipple or pushed over the top thereof, and then the grease gun is rotated until the washer 30 is tightly held against the head 27 of the nipple 28. It is to be understood that both the casing 13 and the plunger 17 move as a unit by means of the threads 12 in the barrel and the threads 13a on the casing 13, the upward movement of the said parts being limited by a set screw 41 in the barrel. When the device is in the Figure 3 position the grease gun is operated to force grease through the bore 21 of the plunger. Due to the fact that the opening 31 in the washer is smaller than either the countersink 23 or nipple bore 32, the pressure under which the lubricant is passing through the device will force the central portion of the washer wall 34 (see Fig. 3) into the bore 32 of the nipple, thereby making a grease-tight seal between the lubricating device and nipple.

It is to be understood that instead of rotating the grease gun, the barrel 11 may be rotated to bring the parts into proper engagement. It is further to be understood that the pressure exerted by the grease gun will be sufficient to displace the ball valve 42 in the nipple to permit grease to pass therethrough.

From the foregoing, it will be seen that we have provided a simple yet efficient lubricating device which when coupled to a nipple or lubricant receiving receptacle will make grease-tight connection therewith, without the use of any pilot or other means usually employed in lubricating devices of this nature.

Having described our invention what we claim as new and desire to secure by Letters Patent is:

1. A nozzle adapted to be secured to a pressure lubricating device and lubricant receptacle, comprising a barrel, a casing adapted to be shifted longitudinally by rotary motion mounted in the said barrel, a perforated wall at the bottom of the casing, a plunger secured to the said casing and having a bore in communication at one end with the pressure device, a perforated and externally countersunk wall at the other end of the plunger, the said perforation being in communication with the plunger bore, a nipple having a bore in alinement with the said perforation means on the barrel for clamping the nipple when the said casing is advanced in the said barrel, a head on the said nipple, and a washer held between the countersunk plunger wall and bottom wall of the casing and having a perforation and perforation enlargement for engagement with the nipple head and in alinement with the nipple bore, said washer perforation being smaller than the plunger perforation and the nipple bore.

2. A nozzle adapted to be secured to a pressure lubricating device and lubricant receptacle, comprising a barrel, a casing adapted to be shifted longitudinally by rotary motion mounted in the said barrel, a perforated wall at the bottom of the casing, a plunger secured to the said casing and having a bore in communication at one end with the pressure device, a perforated wall at the other end of the plunger, the said perforation being in communication with the plunger bore, a nipple having a bore in alinement with the said perforation means on the barrel for clamping the nipple when the said casing is advanced in the said barrel, a head on the nipple, and a washer held between the perforated plunger wall and bottom wall of the casing and having a perforation and perforation enlargement for engagement with the nipple head and in alinement with the nipple bore, the said washer perforation being smaller than the plunger perforation and the nipple bore.

3. A nozzle adapted to be secured to a pressure lubricating device and lubricant receptacle, comprising a barrel, a casing adapted to be shifted longitudinally by rotary motion mounted in the said barrel, a perforated wall at the bottom of the casing, a plunger secured to the said casing and having a bore in communication at one end with the pressure device, a perforated and externally countersunk wall at the other end of the plunger, the said perforation being in communication with the plunger bore, a nipple having a bore in alinement with the said perforation means on the barrel for clamping the nipple when the said case is advanced in the said barrel, a head on the said nipple, and a washer held between the countersunk plunger wall and bottom wall of the casing and having a perforation and perforation enlargement for engagement with the nipple head and in alinement with the nipple bore.

MORRIS NEWMARK.
ELIAS MOSS.